United States Patent [19]

Sircar et al.

[11] Patent Number: 5,753,011
[45] Date of Patent: May 19, 1998

[54] OPERATION OF STAGED ADSORBENT MEMBRANES

[75] Inventors: Shivaji Sircar, Wescosville; David Joseph Parrillo, Fleetwood, both of Pa.

[73] Assignee: Air Products and Chemicals, Inc., Allentown, Pa.

[21] Appl. No.: 785,497

[22] Filed: Jan. 17, 1997

[51] Int. Cl.$^6$ .............. B01D 53/22; B01D 53/047
[52] U.S. Cl. .............. 95/45; 95/47; 95/49; 95/50; 95/51; 95/96; 95/115
[58] Field of Search .............. 95/45, 47–55, 95/96, 98–106, 114, 115

[56] References Cited

U.S. PATENT DOCUMENTS

| | | | |
|---|---|---|---|
| 3,144,313 | 8/1964 | Pfefferle | 55/16 |
| 3,307,330 | 3/1967 | Niedzielski et al. | 95/47 X |
| 4,130,403 | 12/1978 | Cooley et al. | 95/49 |
| 4,264,338 | 4/1981 | Null | 55/16 |
| 4,690,695 | 9/1987 | Doshi | 95/55 |
| 4,701,187 | 10/1987 | Choe et al. | 95/55 X |
| 4,894,068 | 1/1990 | Rice | 95/51 |
| 5,032,148 | 7/1991 | Baker et al. | 95/50 |
| 5,064,446 | 11/1991 | Kusuki et al. | 95/53 |
| 5,064,447 | 11/1991 | Lee | 95/48 |
| 5,104,425 | 4/1992 | Rao et al. | 55/16 |
| 5,185,014 | 2/1993 | Prasad | 55/16 |
| 5,240,472 | 8/1993 | Sircar | 95/52 |
| 5,259,869 | 11/1993 | Auvil et al. | 95/52 |
| 5,314,528 | 5/1994 | Monereau | 95/55 |
| 5,332,424 | 7/1994 | Rao et al. | 95/47 |
| 5,354,547 | 10/1994 | Rao et al. | 423/650 |
| 5,378,263 | 1/1995 | Prasad | 95/45 X |
| 5,401,300 | 3/1995 | Lokhandwala et al. | 95/49 |
| 5,407,466 | 4/1995 | Lokhandwala et al. | 95/49 |
| 5,407,467 | 4/1995 | Lokhandwala et al. | 95/49 |
| 5,415,681 | 5/1995 | Baker | 95/45 |
| 5,431,864 | 7/1995 | Rao et al. | 264/29 |
| 5,435,836 | 7/1995 | Anand et al. | 95/45 |
| 5,447,555 | 9/1995 | Yee et al. | 95/54 |
| 5,447,559 | 9/1995 | Rao et al. | 96/4 |
| 5,507,856 | 4/1996 | Rao et al. | 95/50 |
| 5,507,860 | 4/1996 | Rao et al. | 96/12 |
| 5,556,449 | 9/1996 | Baker et al. | 95/49 |

OTHER PUBLICATIONS

T. Pettersen et al., "Design Studies of Membrane Permeator Process for Gas Separation" in *Gas Sep. Purif.*, vol. 9, No. 3, pp. 151–169 (1995).

N. I. Laguntsov et al., "The Use of Recycle Permeator Systems for Gas Mixture Separation" in *The Journal of Membrane Science*, 67(1992), pp. 15–28.

J. Xu et al., "Gas Separation Membrane Cascades I. One–Compressor Cascades with Minimal Exergy Loss Due to Mixing" in the *Journal of Membrane Science*, 112(1996), pp. 115–128.

J. Xu et al., "Gas Separation Membrane Cascades II. Two–Compressor Cascades" in the *Journal of Membrane Science*, 112 (1996), pp. 129–146.

R. W. Baker et al., "Recovery of Hydrocarbons from Polyolefin Vent Streams Using Membrane Technology", AIChE Spring National Meeting, Feb. 25–29, 1996, New Orleans.

R. W. Spillman et al., "Economics of Gas Separation Membranes" in *Chemical Engineering Progress*, Jan. 1989, pp. 41–62.

B. H. Bhide et al., "Membrane Processes for the Removal of Acid Gases from Natural Gas. I. Process Configurations and Optimization of Operating Conditions" in *Journal of Membrane Science 81* (1993), pp. 209–237.

B. H. Bhide et al., "A New Evaluation of Membrane Processes for the Oxygen–Enrichment of Air.I. Identification of Optimum Operating Conditions and Process Configuration" in *Journal of Membrane Science, 62 (1991)*, pp. 13–35.

S. A. Stern et al., "Recycle and Multimembrane Permeators for Gas Separations", in *Journal of Membrane Science, 20* (1984) pp. 25–43.

B. H. Bhide et al., "Membrane Processes for the Removal of Acid Gases from Natural Gas. II. Effects of Operating Conditions, Economic Parameters, and Membrane Properties" in *Journal of Membrane Science 81 (1993)*, pp. 239–252.

B. H. Bhide et al., "A New Evaluation of Membrane Processes for the Oxygen–Enrichment of Air. II. Effects of Economic Parameters and Membrane Properties" in *Journal of Membrane Science, 62* (1991), pp. 37–58.

*Primary Examiner*—Robert Spitzer

*Attorney, Agent, or Firm*—John M. Fernbacher

[57] ABSTRACT

A staged adsorbent membrane system is operated to separate a gas mixture wherein more strongly adsorbed secondary components preferentially adsorb and permeate through the adsorbent membrane in the first stage. Less strongly adsorbed primary components are recovered therefrom in a nonpermeate gas product stream. Preferably two stages are utilized wherein the permeate gas from the first stage is introduced into the second stage and the nonpermeate gas from the second stage is recycled to the first stage as additional feed gas to increase the overall recovery and/or purity of the nonpermeate gas product. The two-stage membrane system is operated such that the ratio of the recovery of the primary component in the first stage to the recovery of the primary component in the second stage is less than about 1.0. The method is particularly useful for the recovery of hydrogen from hydrogen-containing gas mixtures.

18 Claims, 8 Drawing Sheets

OPERATION OF STAGED ADSORBENT MEMBRANES

CROSS-REFERENCE TO RELATED APPLICATIONS

Not applicable.

STATEMENT REGARDING FEDERALLY SPONSORED RESEARCH OR DEVELOPMENT

The invention disclosed herein was developed under DOE Cooperative Agreement DE-FC04-93AL94461.

BACKGROUND OF THE INVENTION

Gas mixtures can be separated efficiently by the use of permeable membranes in which the more permeable components are selectively recovered in an enriched permeate gas and the less permeable components are recovered in an enriched nonpermeate gas. The extent of enrichment depends on the relative permeabilities of the components in the gas mixture as well as the membrane module design and operating conditions. Different types of gas-permeable membranes can be utilized for such separations including polymeric membranes, porous inorganic membranes having controlled Knudsen diffusion or molecular sieving properties, porous adsorbent membranes, chemically active facilitated transport membranes, and high temperature ion-conducting membranes.

The concept of staging to improve the performance of certain types of permeable membrane systems is well known in the art. Many staging configurations have been proposed and some have been used for the separation of commercially-important gas mixtures. An important and well-known example of effective membrane staging is the separation of uranium isotopes from mixtures of gaseous uranium compounds in multiple-stage gaseous diffusion columns using porous membranes which effect gas separation based on Knudsen diffusion.

A general review and analysis of single- and multiple-stage membrane permeator processes are reported by T. Pettersen and K. M. Lien in an article entitled "Design Studies of Membrane Permeator Processes for Gas Separation" in *Gas Sep. Purif.*, Vol. 9, No. 3, pp. 151–169 (1995). Various design methods and performance characteristics are presented for single-stage and multiple-stage membrane permeation systems which can be used for a variety of gas separations. Two generic types of multiple-stage membrane configurations are described in which either the permeate or nonpermeate stream from a membrane stage is further concentrated in a second membrane stage and the further concentrated stream is recycled to the feed of the first membrane stage. When the membrane permeate contains the desired product component, product purity and/or recovery can be increased by passing the nonpermeate stream to a second membrane stage and recycling the permeate stream from this second membrane stage to the feed of the first membrane stage. When the membrane nonpermeate stream contains the desired product component, product purity and/or recovery can be increased by passing the permeate stream to a second membrane stage and recycling the nonpermeate stream from this second membrane stage to the feed of the first membrane stage.

Methods for analyzing the performance of recycle permeator systems are set forth in a paper entitled "The Use of Recycle Permeator Systems for Gas Mixture Separation" by N. I. Laguntsov et al in the *Journal of Membrane Science*, 67(1992), pp. 15–28. A two-stage permeator system is presented and analyzed in which the permeate stream from the first stage is introduced into a second stage and the nonpermeate from the second stage is recycled to the first stage feed.

Additional analyses and design methods for multiple-stage membrane separation systems are reviewed in an article entitled "Gas Separation Membrane Cascades I. One-Compressor Cascades with Minimal Exergy Loss Due to Mixing" by J. Xu and R. Agrawal in the *Journal of Membrane Science*, 112(1996), pp. 115–128 and a related article entitled "Gas Separation Membrane Cascades II. Two-Compressor Cascades" by R. Agrawal and J. Xu in the *Journal of Membrane Science*, 112(1996), pp. 129–146. These two review articles disclose multiple-stage membrane arrangements, one of which is a two-stage system wherein the permeate stream from the first stage is introduced into a second stage and the nonpermeate from the second stage is recycled to the first stage feed.

A paper by R. W. Baker et al entitled "Recovery of Hydrocarbons from Polyolefin Vent Streams Using Membrane Technology" presented at the AIChE Spring National Meeting, Feb. 25–29, 1996, New Orleans, discloses methods of recovering hydrocarbons from nitrogen purge streams including the use of a two-stage polymeric membrane system in which the permeate stream from the first stage is introduced into a second stage and the nonpermeate from the second stage is recycled to the first stage feed.

Much of the recent art in the staging of membrane separation systems addresses the use of polymeric membranes. A review article by R. W. Spillman entitled "Economics of Gas Separation Membranes" in *Chemical Engineering Progress*, January 1989, pp. 41–62 describes the use of polymeric membrane systems for recovering several commercially-important gas products and the application of staging to these membrane systems. The article also describes the integration of membrane systems with absorption, distillation, and adsorption systems for the most efficient recovery of specific gas products.

The recovery of methane from mixtures of methane, carbon dioxide, and hydrogen sulfide by polymeric membranes is described in related U.S. Pat. Nos. 5,556,449, 5,401,300, 5,407,466, and 5,407,467. The latter two of these patents disclose a two-stage membrane system in which the carbon dioxide- and hydrogen sulfide-enriched permeate stream from the first stage is introduced into a second stage and the methane-enriched nonpermeate from the second stage is recycled to the first stage feed. Methane recoveries across individual stages are greater than 75%, with first stage recoveries being lower than second stage recoveries and ratios of first stage recovery to second stage recovery being 0.80 and above.

The recovery of methane from mixtures of methane and carbon dioxide by staged polymeric membrane systems is described in a paper by B. D. Bhide and S. A. Stern entitled "Membrane Processes for the Removal of Acid Gases from Natural Gas. I. Process Configurations and Optimization of Operating Conditions" in *Journal of Membrane Science* 81 (1993), pp. 209–237. Process calculations and optimization studies are presented for a two-stage membrane system in which the carbon dioxide-enriched permeate stream from the first stage is introduced into a second stage and some or all of the methane-enriched nonpermeate from the second stage is recycled to the first stage feed. The use of a similar staged membrane system for the oxygen-enrichment of air is described in a paper by B. D. Bhide and S. A. Stern entitled "A new Evaluation of Membrane Processes for the Oxygen-enrichment of Air. I. Identification of Optimum Operating Conditions and Process Configuration" in *Journal of Membrane Science* 62 (1991), pp. 13-35.

Adsorbent membranes are used to separate gas mixtures by the combined mechanisms of adsorption and surface diffusion using a thin layer of nanoporous adsorptive material on a meso-macroporous support, wherein the adsorptive material selectively adsorbs and permeates the more strongly adsorbed components. The properties and methods of making these membranes are disclosed in U.S. Pat. Nos. 5,104,425, 5,431,864, and 5,507,860. Adsorbent membranes can be integrated with other separation processes such as pressure swing adsorption and vapor-liquid fractionation as described in U.S. Pat. Nos. 5,507,856, 5,332,424, 5,354,547, 5,435,836, and 5,447,559.

The preferred membrane staging configuration for a given gas separation depends upon numerous factors such as (1) whether the desired product component in the feed gas is recovered in the permeate or nonpermeate stream; (2) the required product purity; (3) the relative value of the product, which determines the acceptable recovery; (4) the tradeoff between membrane capital cost and the cost of gas compression; and (5) how the membrane separation step is integrated with other separation steps such as distillation, adsorption, and absorption. In addition, the separation properties of the membrane material can impact the staging configuration and process design.

The gas separation characteristics of adsorbent membranes are markedly different than those of polymeric membranes because the gas-solid interactions and diffusion mechanisms which occur in the two membranes are fundamentally different. For a given gas mixture, the components will selectively permeate an adsorptive membrane in a different manner than a polymeric membrane. For example, in the recovery of hydrogen from a hydrogen-hydrocarbon gas mixture, the hydrogen selectively permeates a polymeric membrane and is recovered as a hydrogen-enriched low-pressure permeate stream. In contrast, with an adsorbent membrane the hydrocarbons preferentially permeate and the hydrogen-enriched product stream is recovered as the high-pressure nonpermeate stream. Because of these fundamental differences between adsorbent and polymeric membranes, methods for designing and optimizing multistage polymeric membrane systems do not necessarily apply to multistage adsorbent membrane systems.

In the separation of commercially important gas mixtures by membrane systems, a balance between product recovery and product purity must be achieved at acceptable capital and operating costs. In staged membrane systems, the stage configuration and operating conditions of individual stages are important factors in meeting these purity, recovery, and cost requirements. The invention described in the present specification and defined by the claims which follow is an efficient method of operating staged adsorbent membrane systems to achieve these objectives.

BRIEF SUMMARY OF THE INVENTION

The present invention is a method for separating a multicomponent gas mixture comprising at least one primary component and at least one secondary component into a product stream enriched in the primary component and one or more additional product streams enriched in the secondary component. The method comprises introducing a feed gas mixture comprising the primary and secondary components into a first membrane separation zone having a permeable adsorbent membrane which divides the zone into a feed side and a permeate side, wherein the gas passes through the feed side of the membrane separation zone and a portion of the secondary component selectively adsorbs and permeates through the membrane to the permeate side. The product stream enriched in the primary component is withdrawn from the feed side of the first membrane separation zone as a first nonpermeate stream, and a permeate stream which is enriched in the secondary component is withdrawn from the permeate side of the first membrane separation zone.

At least a portion of the permeate stream is introduced as a feed gas into a second membrane separation zone having a permeable adsorbent membrane which divides the zone into a feed side and a permeate side, wherein the feed gas passes through the feed side of the membrane separation zone and a portion of the secondary component selectively adsorbs and permeates through the membrane to the permeate side. An additional product stream enriched in the secondary component is withdrawn therefrom, and a second nonpermeate stream which is further enriched in the primary component is withdrawn from the feed side of the second membrane separation zone. At least a portion of the second nonpermeate stream is combined with the multicomponent gas mixture to provide the feed gas to the first membrane separation zone.

The first and second membrane separation zones are operated such that the ratio of the recovery of the primary component in the first membrane separation zone to the recovery of the primary component in the second membrane separation zone is less than about 1.0 and preferably less than about 0.8, wherein the recovery of the primary component in any membrane separation zone is defined as the molar flow rate of the primary component in the nonpermeate stream withdrawn from the zone divided by the molar flow rate of the primary component in the feed gas introduced into the zone.

The recovery of the primary component in the first membrane separation zone is preferably less than about 75%. The pressure of the feed gas mixture to the first membrane separation zone preferably is greater than or equal to the pressure of the feed gas to the second membrane separation zone, and the pressure of the feed gas mixture to the first membrane separation zone is typically at least 30 psia. The feed gas to the second membrane separation zone may be compressed as necessary. At least a portion of the second nonpermeate stream may be compressed prior to combining with the multicomponent gas mixture to provide the feed gas to the first membrane separation zone.

The multicomponent gas mixture may comprise hydrogen as a primary component and one or more secondary components selected from the group consisting of hydrocarbons having from one to five carbon atoms. Alternatively, when hydrogen is a primary component, the one or more secondary components can be selected from the group consisting of carbon oxides, methane, ammonia, nitrogen, and hydrogen sulfide.

The stream from the membrane separation system which is enriched in the primary component optionally is passed into a pressure swing adsorption system and a final product stream which is further enriched in the primary component is withdrawn therefrom. Alternatively, the stream from the membrane system which is enriched in the primary component can be introduced into a thermal swing adsorption system and a stream which is further enriched in the primary component withdrawn therefrom. In another optional operating mode, the stream from the membrane system which is further enriched in the primary component is passed into a thermal swing adsorption system, and a stream which is further enriched in the primary component withdrawn therefrom and passed into a pressure swing adsorption system. A final product stream which is still further enriched in the primary component is withdrawn from the pressure swing adsorption system.

The permeable adsorbent membrane used in the first and second membrane separation zones comprises adsorbent material which preferentially adsorbs the secondary component or components in the gas mixture being separated. The adsorbent material is selected from the group consisting of activated carbon, zeolite, activated alumina, silica, and combinations thereof. The same adsorbent material can be used in each membrane separation zone, or alternatively a different adsorbent material can be used in each membrane separation zone.

The invention is also an improvement in the method of separating a multicomponent gas mixture containing at least one primary component and at least one secondary component into a product stream enriched in the primary component and one or more additional product streams enriched in the secondary component, wherein the method includes:

(a) introducing a feed gas mixture comprising the primary and secondary components into a first membrane separation zone having a gas permeable membrane which divides the zone into a feed side and a permeate side, wherein the gas passes through the feed side of the membrane separation zone and a portion of the secondary component selectively permeates through the membrane to the permeate side;

(b) withdrawing from the feed side of the first membrane separation zone a first nonpermeate stream as the product stream enriched in the primary component;

(c) withdrawing from the permeate side of the first membrane separation zone a permeate stream which is enriched in the secondary component;

(d) introducing at least a portion of the permeate stream as a feed gas into a second membrane separation zone having a gas permeable membrane comprising adsorbent material which divides the zone into a feed side and a permeate side, wherein the feed gas passes through the feed side of the membrane separation zone and a portion of the secondary component selectively permeates through the membrane to the permeate side, and withdrawing therefrom an additional product stream enriched in the secondary component; and (e) withdrawing from the feed side of the second membrane separation zone a second nonpermeate stream which is further enriched in the primary component, and combining at least a portion of the second nonpermeate stream with the multicomponent gas mixture to provide the feed gas to the first membrane separation zone.

The improvement of the present invention comprises utilizing an adsorbent membrane comprising adsorbent material as the gas permeable membrane in each of the first and second membrane separation zones in which a portion of the secondary component is selectively adsorbed from the feed gas to each zone by the adsorbent material and permeates through the adsorbent membrane to the permeate side of each zone. The first and second membrane separation zones are operated such that the ratio of the recovery of the primary component in the first membrane separation zone to the recovery of the primary component in the second membrane separation zone is less than about 1.0, and preferably less than about 0.8, wherein the recovery of the primary component in any membrane separation zone is defined as the molar flow rate of the primary component in the nonpermeate stream withdrawn from the zone divided by the molar flow rate of the primary component in the feed gas introduced into the zone.

DETAILED DESCRIPTION OF THE INVENTION

Staging improves the performance of permeable membrane systems by increasing either or both the recovery and purity of the product components. When the nonpermeate stream from a membrane module or stage contains the desired product component, product purity and recovery can be increased by passing the permeate stream to a second membrane module or stage and recycling the nonpermeate stream from this second membrane stage to the feed of the first membrane stage. The product is recovered as the nonpermeate stream from the first membrane stage and the removed impurities are withdrawn as the permeate stream from the second membrane stage.

The use of staged adsorbent membranes in this configuration is of particular utility in separating gas mixtures in which the primary product is obtained in the nonpermeate stream at near feed pressure. This configuration is preferred for example in the recovery of hydrogen from mixtures of hydrogen and higher molecular weight components such as carbon oxides, hydrogen sulfide, ammonia, and hydrocarbons having up to about five carbon atoms. Other gases amenable to separation by this method include mixtures of helium and natural gas components as well as the recovery of methane from mixtures of methane with impurities such as carbon oxides, hydrogen sulfide, and heavier hydrocarbons.

In the present specification, the term "stage" is defined as an adsorbent membrane module comprising an assembly of one or more adsorbent membranes contained within a vessel having one or more feed gas inlets, a high pressure gas outlet, one or more low pressure permeate gas outlets, and optionally a low pressure sweep gas inlet. Each of the adsorbent membranes contained in the vessel can be supported on a substrate having a tubular, flat sheet, or monolith configuration as described below.

The use of staged adsorbent membranes of the present invention for such hydrogen-containing gas mixtures improves the recovery and purity of the hydrogen product and allows recovery of the hydrogen product at near feed pressure. This latter feature is especially beneficial when the hydrogen product is further purified by pressure or thermal swing adsorption as later described.

Figure 1:
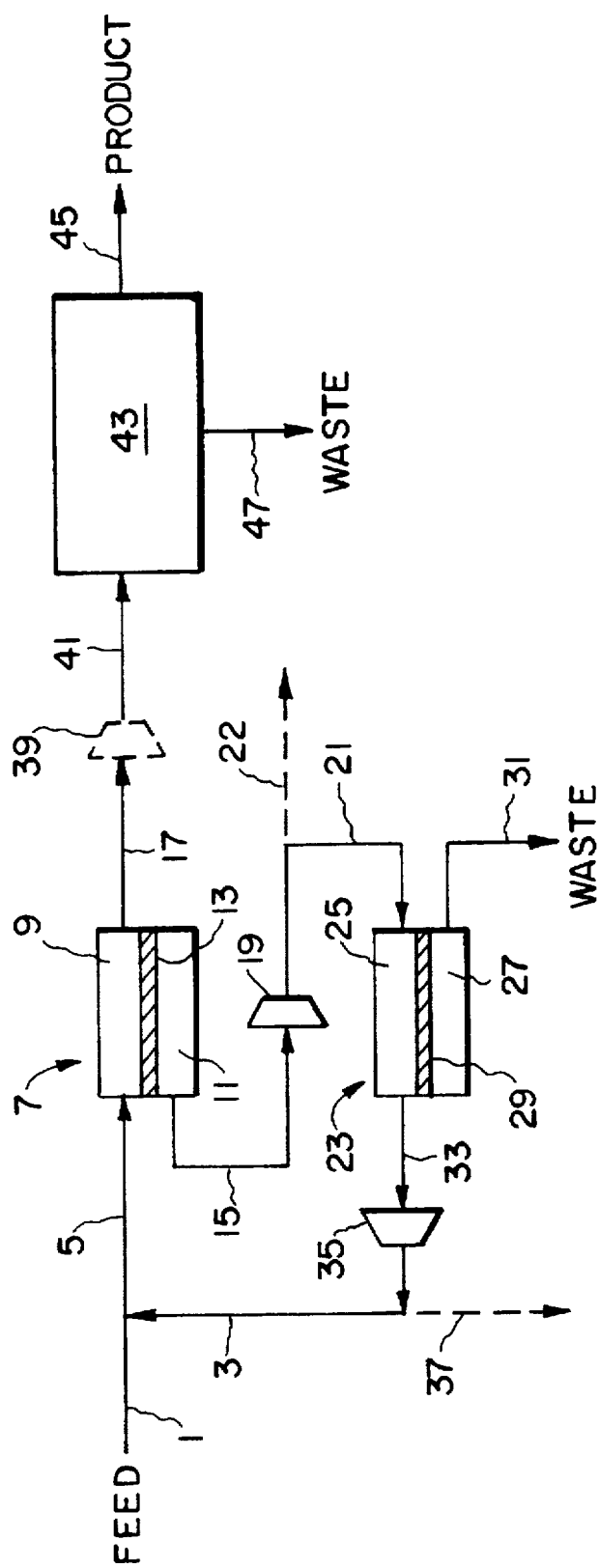
FIG. 1 is a schematic flow diagram which includes a two-stage adsorbent membrane separation system of the present invention.

The present invention is illustrated in FIG. 1. Fresh feed gas mixture 1 is combined with recycle stream 3 (later defined) to form net feed 5 which is introduced at a pressure of about 30 to about 1500 psia into adsorbent membrane separation zone 7 which is divided into feed side 9 and permeate side 11 by adsorbent membrane 13. This adsorbent membrane comprises adsorbent material supported by a porous substrate in which the adsorbent material is a coating on the surface of the substrate. Alternatively, some or all of the adsorbent material is contained within the pores of the substrate. Adsorbent membrane separation zone 7 as shown in FIG. 1 is representative of an adsorbent membrane stage as defined above and is the first of two stages as described below.

Fresh feed gas mixture 1 contains at least one primary component and at least one secondary component, wherein the secondary component is more strongly adsorbed on the adsorbent material used and is more permeable through adsorbent membrane 13, while the primary component is less strongly adsorbed on the adsorbent material and is less permeable through adsorbent membrane 13. Additional primary and secondary components may be present, each of which has a different strength of adsorption and permeability through adsorbent membrane 13. More strongly adsorbed components with higher permeability can inhibit the permeability of less strongly adsorbed components, which improves the relative separation of desired product components and undesired impurity components.

The adsorbent material can be selected from activated carbon, zeolite, activated alumina, silica, and mixtures or combinations thereof. Activated carbon is a preferred adsorbent material for the separation of hydrogen from mixtures containing hydrogen and hydrocarbons, carbon oxides, ammonia, or hydrogen sulfide. The characteristics and methods of preparation of representative activated carbon adsorbent membranes are described in U.S. Pat. No. 5,104,425 which incorporated herein by reference. A representative type of membrane is made by coating a porous graphite substrate with a thin film of an aqueous suspension (latex) containing a polyvinylidine chloride polymer, drying the coated substrate at 150° C. for five minutes, heating the substrate in nitrogen to 600°–1000° C. at a rate of 1° C. per minute, holding at temperature for three hours, and cooling to ambient temperature at 1°–10° C. per minute. The polymer coating is carbonized during the heating step thereby forming an ultrathin layer of microporous carbon on the substrate. Other polymers can be used for coating prior to the carbonization step provided that these polymers can be carbonized to form the required porous carbon adsorbent material. Such alternate polymers can be selected from polyvinyl chloride, polyacrylonitrile, styrene-divinylbenzene copolymer, and mixtures thereof. Alternatively, the substrate can be a porous ceramic material. The substrate serves as a support for the adsorptive material and typically the substrate has essentially no effect on the separation of the gas mixture.

The adsorbent membrane and substrate can be fabricated in a tubular configuration in which the microporous adsorbent material is deposited on either the inner or the outer surface of a tubular porous substrate, and the resulting tubular adsorbent membrane elements can be assembled in a shell-and-tube configuration in an appropriate pressure vessel to form a membrane module. Alternatively, the adsorbent membrane and support can be fabricated in a flat sheet configuration which can be assembled into a module using a plate-and-frame arrangement. Alternatively, the adsorbent membrane and support can be fabricated in a monolith or multichannel configuration to provide a high membrane surface area per unit volume of membrane module. The support material of the tubular membrane, the flat sheet membrane, or the monolith can be a porous ceramic, porous glass, porous metal, or a porous carbon material. A hollow fiber configuration may be used in which the adsorbent membrane is supported by fine hollow fibers of the substrate material. A plurality of membrane modules in parallel or series can be utilized when gas feed rates and separation requirements exceed the capability of a single module of practical size. In each of these configurations, the membrane zone is divided into a feed side and permeate side as illustrated in schematic fashion by membrane separation zone 7 in FIG. 1.

Net feed 5 at a pressure of about 30 to about 1500 psia is passed through feed side 9 of membrane separation zone 7, and portions of the more strongly adsorbed secondary components contained therein selectively adsorb and permeate through adsorbent membrane 13 by the dominant mechanism of selective surface flow in the adsorbed phase. The resulting separation yields permeate 15 which is enriched in the secondary components and nonpermeate 17 which is enriched in the primary component. Nonpermeate stream 17 is at a pressure slightly less than feed 5 due to the small pressure drop through feed side 9 while permeate 15 is at a significantly lower pressure, typically between 2 and 25 psia.

Permeate 15 typically contains a significant concentration of valuable primary components which preferably should be recovered in addition to the primary components in nonpermeate stream 17. This is accomplished by compressing permeate 15 if necessary to a pressure of 30 to 1500 psia in compressor 19 and introducing compressed feed 21 into adsorbent membrane separation zone 23 which is divided into feed side 25 and permeate side 27 by adsorbent membrane 29. A portion 22 of permeate 15 from membrane separation zone 7 optionally can be withdrawn prior to membrane separation zone 23, either before or after compressor 19.

Portions of the more strongly adsorbed secondary components in compressed feed 21 selectively adsorb and permeate through adsorbent membrane 29 by the dominant mechanism of selective surface flow in the adsorbed phase.

The resulting separation yields permeate 31 which is further enriched in the secondary components and is withdrawn as a waste or byproduct stream. Nonpermeate 33 is enriched in the primary components and is at a pressure slightly less than compressed feed 21 due to the small pressure drop through feed side 25, while permeate 31 is at a significantly lower pressure, typically between 2 and 25 psia.

Nonpermeate 33 optionally is compressed in compressor 35 to provide recycle stream 3 which is combined with fresh feed 1 to provide net feed 5 which is processed as described earlier. This recycle of nonpermeate 33 significantly increases the recovery of primary components in nonpermeate 17 from membrane separation zone 7. Optionally, a portion 37 of nonpermeate 33 can be withdrawn prior to recycle, either before or after compressor 35.

Adsorbent membrane separation zones 7 and 23 typically are operated at ambient temperatures, but if desired may be operated at temperatures as low as −100° C. or as high as 150° C.

The same adsorbent material may be used in adsorbent membranes 13 and 29, and these adsorbent membranes typically have the same or similar gas separation characteristics. If desired, the adsorbent membranes may be made of the same adsorbent material (e.g. activated carbon) but with different pore size distributions in each zone. Alternatively, different adsorbent materials having different separation characteristics can be utilized in adsorbent membranes 13 and 29 if desired to optimize the separation performance of adsorbent membrane separation zones 7 and 23. If desired, either or both of the membranes in the two separation zones can be polymeric membranes.

The invention as described above preferably utilizes two adsorbent membrane separation zones or stages, but additional stages can be utilized if extremely high product purity or recovery is required.

In the operation of a single-stage gas-permeable membrane for the separation of gas mixtures, the degree of recovery of the desired product component and the purity of the product component are related such that higher recovery is achieved only at lower purity, and conversely higher product purity is attained only at the expense of decreased recovery. This inverse relationship occurs for polymeric membranes and porous diffusion membranes as is known in the art, and has been found to occur as well for adsorbent membranes associated with the present invention as described in the following Examples. When membranes are arranged in multiple stages, the relationship between product recovery and purity becomes more complex. The overall product recovery and overall product purity in a multi-stage membrane system are functions of the staging configuration and the operating conditions of each individual stage.

It has been discovered for the staging configuration described above for the present invention, in which the desired product component is recovered in the nonpermeate stream from the first stage of a two-stage adsorbent membrane system, that a preferred operating mode exists for each stage which results in the most favorable tradeoff between overall product recovery and overall product purity for the two-stage system. In the preferred operating mode, the first and second membrane stages are operated such that the ratio of the recovery of the primary component in the first stage to the recovery of the primary component in the second stage is less than about 1.0 and preferably less than about 0.8. This ratio of the primary component recoveries is defined as the stage recovery ratio for that component. Recovery of a primary component in any given stage is defined as the fraction or percentage of the primary component in the feed to that stage which is recovered in the nonpermeate product stream from that stage. Preferably the recovery of the primary component in the first stage is less than about 75%. Referring to FIG. 1, the preferred mode of operation is that the stage recovery ratio for adsorbent membrane separation zones 7 and 23 is less than about 1.0 and preferably less than about 0.8. The recovery of the primary component in adsorbent membrane separation zone 7 is less than about 75%.

Nonpermeate 17, which is enriched in the primary component and contains one or more residual secondary components, optionally is further enriched by introducing the nonpermeate at about 100 to about 500 psia into pressure swing adsorption (PSA) system 43. If feed 5 to the adsorbent membrane zone 7 is below 100 psia, compressor 39 is utilized to provide compressed nonpermeate 41 as feed to PSA system 43. High purity primary product 45 and waste stream 47 are withdrawn therefrom. Adsorption system 43 can be a pressure swing adsorption system (PSA) of a type known in the art; alternatively, a thermal swing adsorption system of a type known in the art can be utilized in place of a PSA system if nonpermeate 17 contains dilute residual secondary components which are strongly adsorbed on the adsorbent utilized in adsorption system 43.

The adsorbent membrane and staging configuration of the present invention are particularly well suited for the purification and recovery of low molecular weight primary components such as hydrogen, helium, or methane from mixtures which also contain higher molecular weight secondary components such as carbon oxides, water, hydrogen sulfide, ammonia, and hydrocarbons. A beneficial characteristic of adsorbent membranes used in such separations is that the heavier contaminant components selectively permeate through the membrane and the lighter primary component is recovered as a nonpermeate at near feed pressure. Recovery of the primary component at relatively high purity, at acceptable recovery, and at high pressure is particularly advantageous when final purification of the primary component by pressure or thermal swing adsorption is required.

As illustrated in the Examples which follow, operation of the two-stage adsorbent membrane system in this preferred mode allows the overall recovery of the primary component to be increased with no penalty or a relatively small penalty in decreased product purity. When the two-stage adsorbent membrane system is operated at conditions outside of this preferred mode, however, increases in overall product recovery are accompanied by more significant decreases in product purity. In the preferred mode of the invention (i.e. at a stage recovery ratio of less than about 1.0), a higher product purity can be attained for a given overall product recovery compared with the purity attained by operating outside the preferred mode (i.e. at a stage recovery ratio of greater than 1.0).

The recovery of the primary component in each stage of the two-stage system can be controlled by proper selection of the design and operating conditions for each stage. An important design parameter which determines the recovery of the primary component in a given stage is the ratio of the effective membrane surface area (A) to the feed flow rate (F) to that stage, commonly designated as A/F. In a given stage, a lower value of A/F yields a higher recovery and lower purity, while conversely a higher value of A/F yields a higher purity and lower recovery. The separation properties of the adsorbent membrane material, namely selectivity and permeability, also will affect the primary product recovery. Adsorbent membranes having different separation properties can be used in each stage if desired. The ratio of feed pressure to permeate pressure also will affect primary product recovery in each stage, as will the stage operating temperature. These design and operating parameters can be selected for each stage to give the desired stage recovery ratio for the present invention.

EXAMPLE 1

An adsorbent membrane was prepared by coating the bore side of a macroporous alumina support tube having a length of 30 cm, an internal diameter of 0.56 cm, and a wall thickness of 0.165 cm with a thin uniform layer of polyvinilidene chloride-acrylate terpolymer latex which contained polymer beads having diameters of 0.1–0.14 μm in an aqueous emulsion containing 4 wt % solids. The coating was dried under nitrogen at 50° C. and the coated tube was heated to 600° C. under nitrogen purge to carbonize the coating and form a layer of adsorbent carbon. The completed tubular membrane was mounted in a pressure vessel shell such that pressurized feed gas could be introduced into the bore side and recovered at near feed pressure from the bore side, while permeate gas could be collected from the shell side in a countercurrent mode at low pressure. Pressures and flow rates of the feed, non-permeate, and permeate gas streams were measured by the usual laboratory methods.

The tubular adsorbent membrane was then subjected to laboratory testing for the separation of a mixture representative of an offgas from a petroleum refinery fluid catalytic cracking (FCC) unit which contained 20% hydrogen, 20% methane, 16% ethane plus ethylene, and 44% propane plus propylene on a molar basis.

Figure 2:
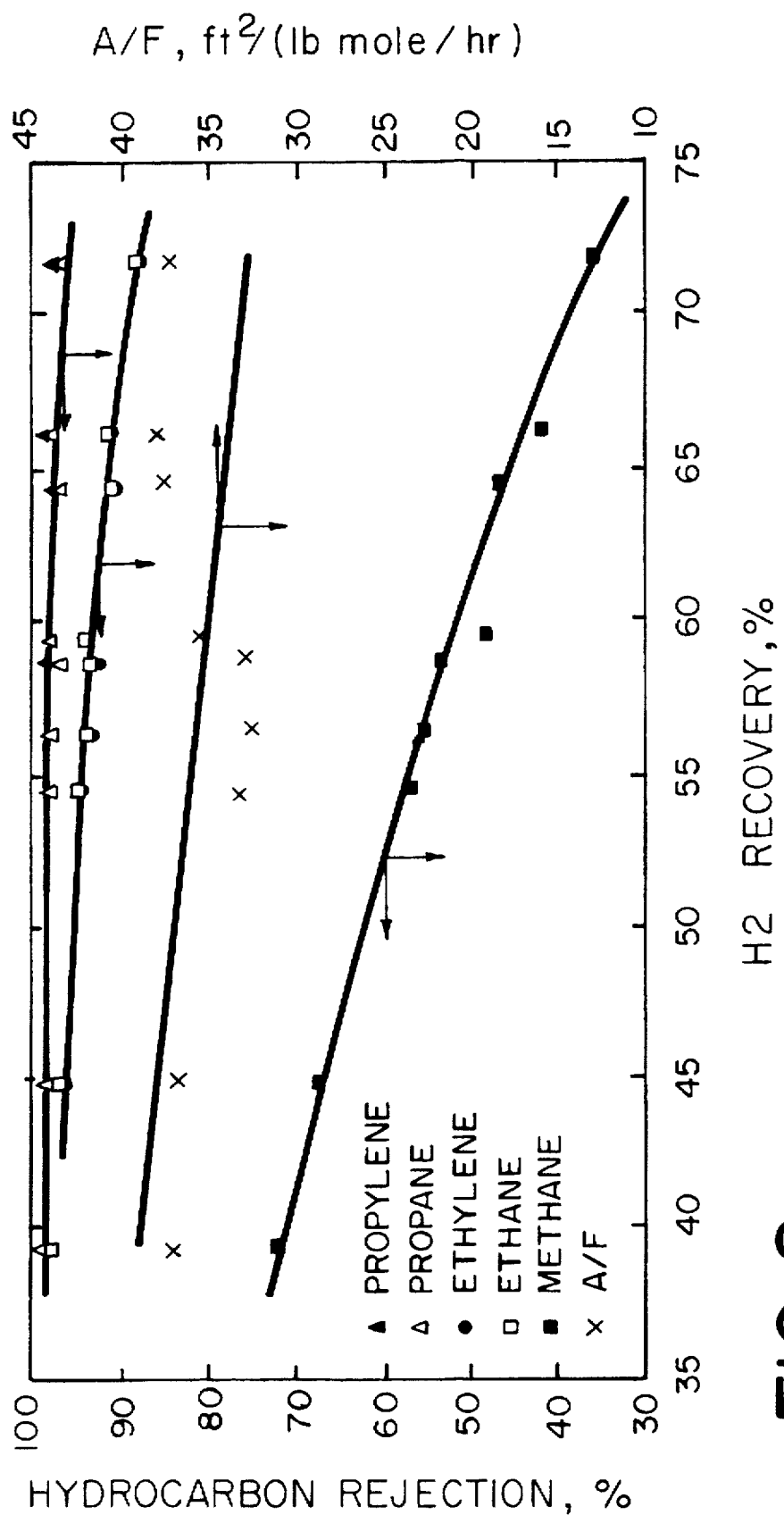
FIG. 2 is a plot of hydrocarbon rejection vs hydrogen recovery for the separation of a refinery fluid catalytic cracker offgas using a tubular adsorbent membrane of the present invention.

The results of the tests are plotted in FIG. 2 which shows the performance characteristics of the tubular adsorbent membrane in a plot of hydrocarbon rejection vs. hydrogen recovery for each of the hydrocarbons in the mixture. A plot of A/F vs. hydrogen recovery is also included.

EXAMPLE 2

The performance data of Example 1 were used to estimate the performance of the two-stage adsorbent membrane system of FIG. 1. The system is operated at a feed pressure of 3.0 atm (abs) and ambient temperature, with a first stage hydrogen recovery of 55% and hydrocarbon rejections of 98.8% for propane plus propylene, 95% for ethane plus ethylene and 57.5% for methane. The second stage operates at a 70% hydrogen recovery and hydrocarbon rejections of 96.6%, 89.4%, and 35.6% for propane plus propylene, ethane plus ethylene, and methane respectively. The first stage yields a nonpermeate product stream containing 51.8% hydrogen, 43.5% methane, 2.9% ethane plus ethylene, and 1.8% propane plus propylene (molar basis). The overall hydrogen recovery for the two-stage system is 80.3%. A stream and operating summary for the two-stage system is given in Table 1.

TABLE 1

| Two-Stage Membrane System with FCC Offgas | | | | | |
|---|---|---|---|---|---|
| Stream No. | Flow | Composition, Mole % | | | |
| (FIG. 1) | MM SCFD | $H_2$ | $CH_4$ | $C_2H_4 + C_2H_6$ | $C_3H_6 + C_3H_8$ |
| 1 | 1.00 | 20.0 | 20.0 | 16.0 | 44.0 |
| 3 | 0.24 | 37.9 | 48.4 | 7.4 | 6.3 |
| 5 | 1.24 | 23.5 | 25.6 | 14.3 | 36.6 |
| 15 | 0.93 | 14.1 | 19.6 | 18.1 | 48.2 |
| 17 | 0.31 | 51.8 | 43.5 | 2.9 | 1.8 |
| 31 | 0.69 | 5.7 | 9.4 | 21.9 | 63.0 |

TABLE 1-continued

| Two-Stage Membrane System with FCC Offgas | | | |
|---|---|---|---|
|  | Stage 1 | Stage 2 | Overall |
| $H_2$ Recovery, % | 55.0 | 70.0 | 80.3 |
| $CH_4$ Rejection, % | 57.0 | 35.6 | 32.5 |
| Ethane and Ethylene Rejection, % | 95.0 | 89.4 | 94.4 |
| Propane and Propylene Rejection, % | 98.8 | 96.6 | 98.7 |
| Relative Membrane Area | 0.59 | 0.41 | 1.0 |

EXAMPLE 3

The tubular adsorbent membrane of Example 1 was then subjected to laboratory testing for the separation of a mixture representative of an offgas from a steam-methane reformer pressure swing adsorption (PSA) system which contained 35% hydrogen, 10% methane, and 55% carbon dioxide on a molar basis. The testing and data reduction was conducted in the same manner as Example 1 except that the feed pressure was 4.0 atm (abs) and no sweep gas was used.

Figure 3:
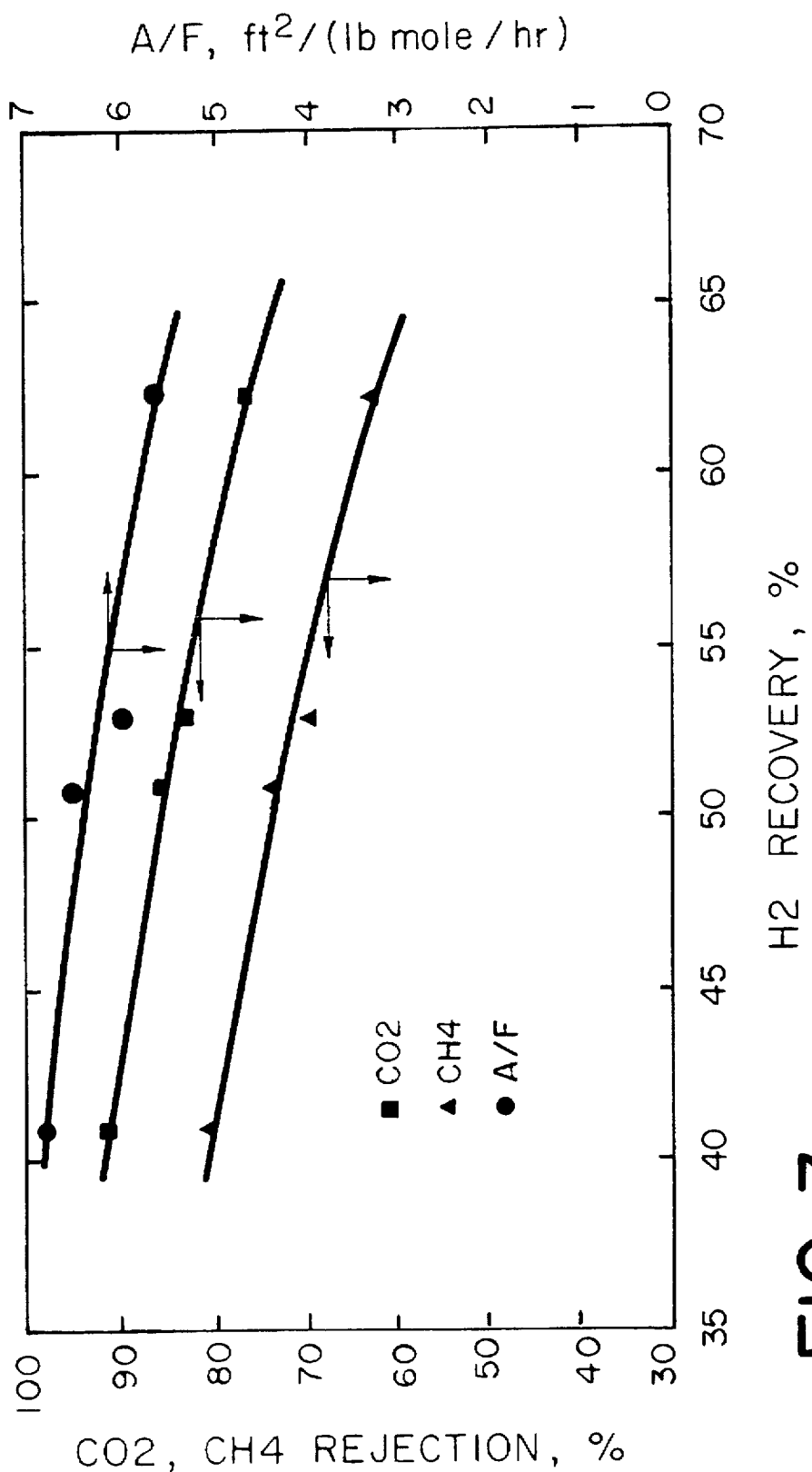
FIG. 3 is a plot of $CO_2$ and $CH_4$ rejection vs hydrogen recovery for the separation of offgas from a pressure swing adsorption system of a steam-methane reforming hydrogen production system using a tubular adsorbent membrane of the present invention.

The results of the tests are plotted in FIG. 3 which shows the performance characteristics of the tubular adsorbent membrane in a plot of methane and carbon dioxide rejection vs. hydrogen recovery. A plot of A/F vs. hydrogen recovery is also included.

EXAMPLE 4

The performance data of FIG. 3 were used to calculate the performance of the two-stage adsorbent membrane system of FIG. 1. The system is operated at a feed pressure of 4.0 atm (abs) and ambient temperature, with a first stage hydrogen recovery of 40%, and with carbon dioxide and methane rejections of 91.9% and 80.6% respectively. The second stage operates at a 65% hydrogen recovery with carbon dioxide and methane rejections of 73.4% and 58.1% respectively. The first stage yields a nonpermeate product stream containing 72.2% hydrogen, 9.2% methane, and 18.6% carbon dioxide (molar basis). The overall hydrogen recovery for the two-stage system is 66%. A stream and operating summary for the two-stage system is given in Table 2.

TABLE 2

| Two-Stage Membrane System with PSA Offgas | | | | |
|---|---|---|---|---|
| Stream No. | Flow, | Composition, Mole % | | |
| (FIG. 1) | MM SCFD | Hydrogen | Methane | $CO_2$ |
| 1 | 1.00 | 35.0 | 10.0 | 55.0 |
| 3 | 0.45 | 49.4 | 11.3 | 39.3 |
| 5 | 1.43 | 39.5 | 10.4 | 50.1 |
| 15 | 1.13 | 30.3 | 10.7 | 59.0 |
| 17 | 0.32 | 72.2 | 9.2 | 18.6 |
| 31 | 0.68 | 17.7 | 10.3 | 72.0 |
|  |  | Stage 1 | Stage 2 | Overall |
| $H_2$ Recovery, % |  | 40.0 | 65.0 | 65.6 |
| $CH_4$ Rejection, % |  | 80.6 | 58.1 | 70.7 |
| $CO_2$ Rejection, % |  | 91.9 | 73.4 | 89.3 |
| Relative Membrane Area |  | 0.63 | 0.37 | 1.0 |

EXAMPLE 5

The performance data of FIG. 3 were used to calculate and compare the overall hydrogen product recovery and purity for the two-stage system as a function of the individual hydrogen recoveries of stages 1 and 2. The stage recovery ratio for hydrogen, defined as the hydrogen recovery in the first stage divided by the hydrogen recovery in the second stage, was calculated at a constant hydrogen recovery of 40% in the first stage and for hydrogen recoveries of 40% to 70% in the second stage. The overall hydrogen recovery for the two-stage system was determined at each value of the calculated hydrogen stage recovery ratio. The hydrogen stage recovery ratio then was estimated at a constant hydrogen recovery of 40% in the second stage and for hydrogen recoveries of 40% to 70% in the first stage, and again the overall hydrogen recovery for the two-stage system was determined at each value of the calculated hydrogen stage recovery ratio. These results are plotted in FIG. 4.

The performance data of FIG. 3 were used to determine the hydrogen product purity at each of the calculated values of the hydrogen stage recovery ratio given above. Hydrogen product purity is represented by the residual concentration of carbon dioxide in the product gas. These results are plotted in FIG. 5.

Figure 4:
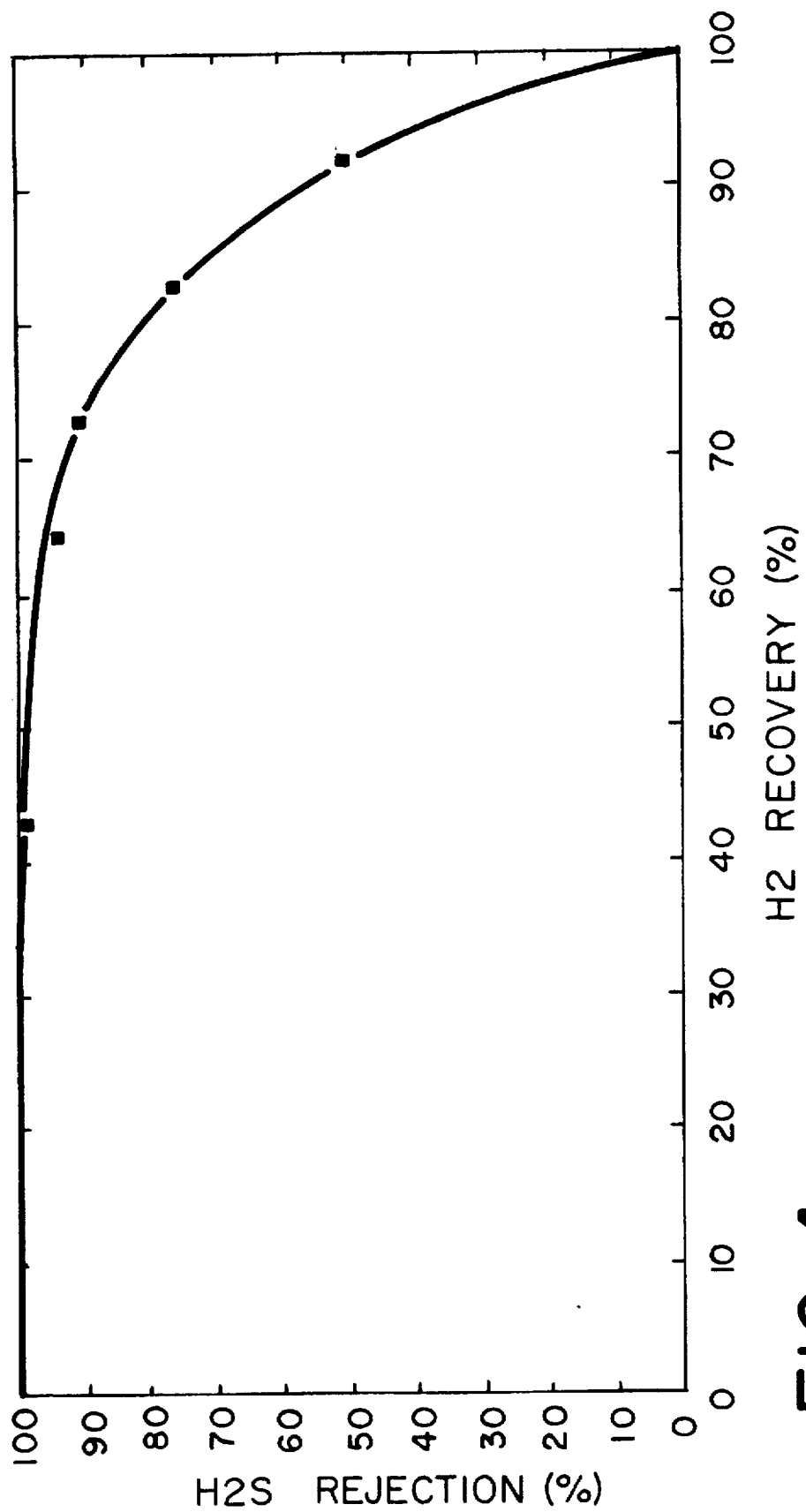
FIG. 4 is a plot of hydrogen sulfide rejection vs hydrogen recovery for the separation of a hydrogen-hydrogen sulfide mixture using a tubular adsorbent membrane of the present invention.
Figure 5:
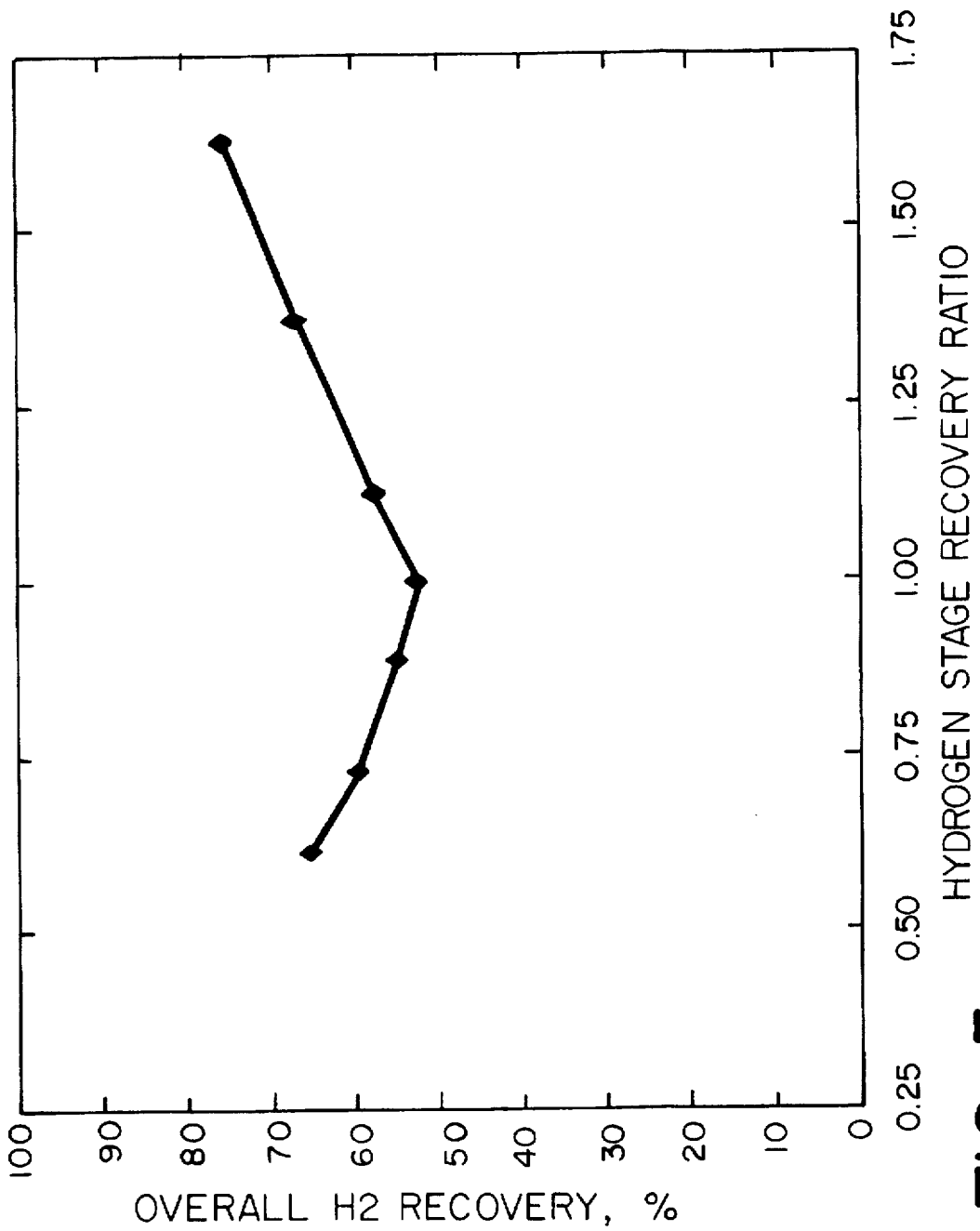
FIG. 5 is a plot of the overall hydrogen recovery vs the hydrogen stage recovery ratio for the separation of a hydrogen-carbon dioxide-methane mixture using a two-stage tubular adsorbent membrane of the present invention.

FIGS. 4 and 5 in combination illustrate an important feature of the invention, as described in general terms earlier in this specification, in which a preferred operating mode exists for each stage which results in the most favorable tradeoff between overall hydrogen product recovery and overall hydrogen product purity for the two-stage system. In the preferred operating mode, the first and second membrane stages are operated such that the hydrogen stage recovery ratio is less than about 1.0 and preferably less than about 0.8. It is seen from FIGS. 4 and 5 that below a hydrogen stage recovery ratio of about 1.0, increasing the overall hydrogen recovery by reducing the hydrogen stage recovery ratio results in a very slight increase in hydrogen product purity. For example, if the hydrogen stage recovery ratio is reduced from about 1.0 to about 0.62, the overall hydrogen recovery increases from about 53% to about 66% (FIG. 4) while the concentration of carbon dioxide in the hydrogen product actually drops slightly from about 18.5 mole % (FIG. 5). In contrast, increasing the overall hydrogen recovery by increasing the hydrogen stage recovery ratio above about 1.0 results in a decrease in hydrogen product purity. For example, if the hydrogen stage recovery ratio is increased from about 1.0 to about 1.38, the overall hydrogen recovery increases from about 53% to about 67% (FIG. 4) but the concentration of carbon dioxide in the hydrogen product increases from about 18.5 mole % to about 26 mole % (FIG. 5).

Thus the most favorable operating region for the two-stage adsorbent membrane system occurs below a hydrogen stage recovery ratio of about 1.0 wherein the hydrogen recovery in the first stage is lower, and preferably significantly lower, than the hydrogen recovery in the second stage. Operating the two-stage system above a hydrogen recovery ratio of about 1.0 can yield an acceptable overall recovery of hydrogen, but with a penalty of decreased hydrogen product purity. This is illustrated by an example wherein an overall hydrogen recovery of 65% is required. From FIG. 4 it is seen that this recovery can be achieved at a hydrogen stage recovery ratio of either about 0.68 or about 1.32. From FIG. 5 it is seen that a hydrogen stage recovery ratio of about 0.68 yields a hydrogen product containing about 18.5 mole % carbon dioxide, while a hydrogen stage recovery ratio of about 1.32 yields a hydrogen product containing about 27 mole % carbon dioxide.

EXAMPLE 6

The tubular adsorbent membrane of Example 1 was subjected to laboratory testing for the separation of a hydrogen-hydrogen sulfide mixture which contained 50% hydrogen and 50% hydrogen sulfide on a molar basis at a pressure of 115 psia. The testing used the same procedures as Example 1.

The results of the tests are plotted in FIG. 4 which shows the performance characteristics of the tubular adsorbent membrane in a plot of hydrogen sulfide rejection vs. hydrogen recovery for the mixtures and conditions tested.

EXAMPLE 7

The performance data of FIG. 4 were used to estimate the performance of the two-stage adsorbent membrane system of FIG. 1 with an equimolar hydrogen-hydrogen sulfide feed mixture. The system is operated at a feed pressure of 115 psia and ambient temperature with a first stage hydrogen recovery of 30% and a hydrogen sulfide rejection of 99.1%. The second stage operates at a 90% hydrogen recovery with a hydrogen sulfide rejection of 60.3%. The first stage yields a nonpermeate product stream containing 98.0% hydrogen and 2.0% hydrogen sulfide(molar basis). The overall hydrogen recovery for the two-stage system is 77% and the overall hydrogen sulfide rejection is 98.3%. A stream and operating summary for the two-stage system is given in Table 3.

TABLE 3

Two-Stage Membrane System with Hydrogen-Hydrogen Sulfide Mixture

| Stream No. | Flow, | Composition, Mole % | |
|---|---|---|---|
| (FIG. 1) | MM SCFD | Hydrogen | Hydrogen Sulfide |
| 1 | 1.00 | 50.0 | 50.0 |
| 3 | 1.18 | 72.2 | 27.8 |
| 5 | 2.18 | 62.0 | 38.0 |
| 15 | 1.77 | 53.6 | 46.4 |
| 17 | 0.41 | 98.0 | 2.0 |
| 31 | 0.59 | 16.1 | 83.9 |

| | Stage 1 | Stage 2 | Total |
|---|---|---|---|
| Hydrogen Recovery, % | 30 | 90 | 77 |
| Hydrogen Rejection, % | 99.1 | 60.3 | 98.3 |
| Relative Membrane Area | 0.81 | 0.19 | 1.0 |

EXAMPLE 8

The performance data of FIG. 4 were used to estimate and compare the overall hydrogen product recovery and purity for the two-stage system as a function of the individual hydrogen recoveries of stages 1 and 2. The stage recovery ratio for hydrogen, defined as the hydrogen recovery in the first stage divided by the hydrogen recovery in the second stage, was calculated at a constant hydrogen recovery of 30% in the first stage with hydrogen recoveries of 30% to 90% in the second stage. The overall hydrogen recovery for the two-stage system was determined at each value of the calculated hydrogen stage recovery ratio. The hydrogen stage recovery ratio then was calculated at a constant hydrogen recovery of 30% in the second stage with hydrogen recoveries of 30% to 90% in the first stage, and again the overall hydrogen recovery for the two-stage system was determined at each value of the calculated hydrogen stage recovery ratio. These results are plotted in FIG. 7.

Figure 6:
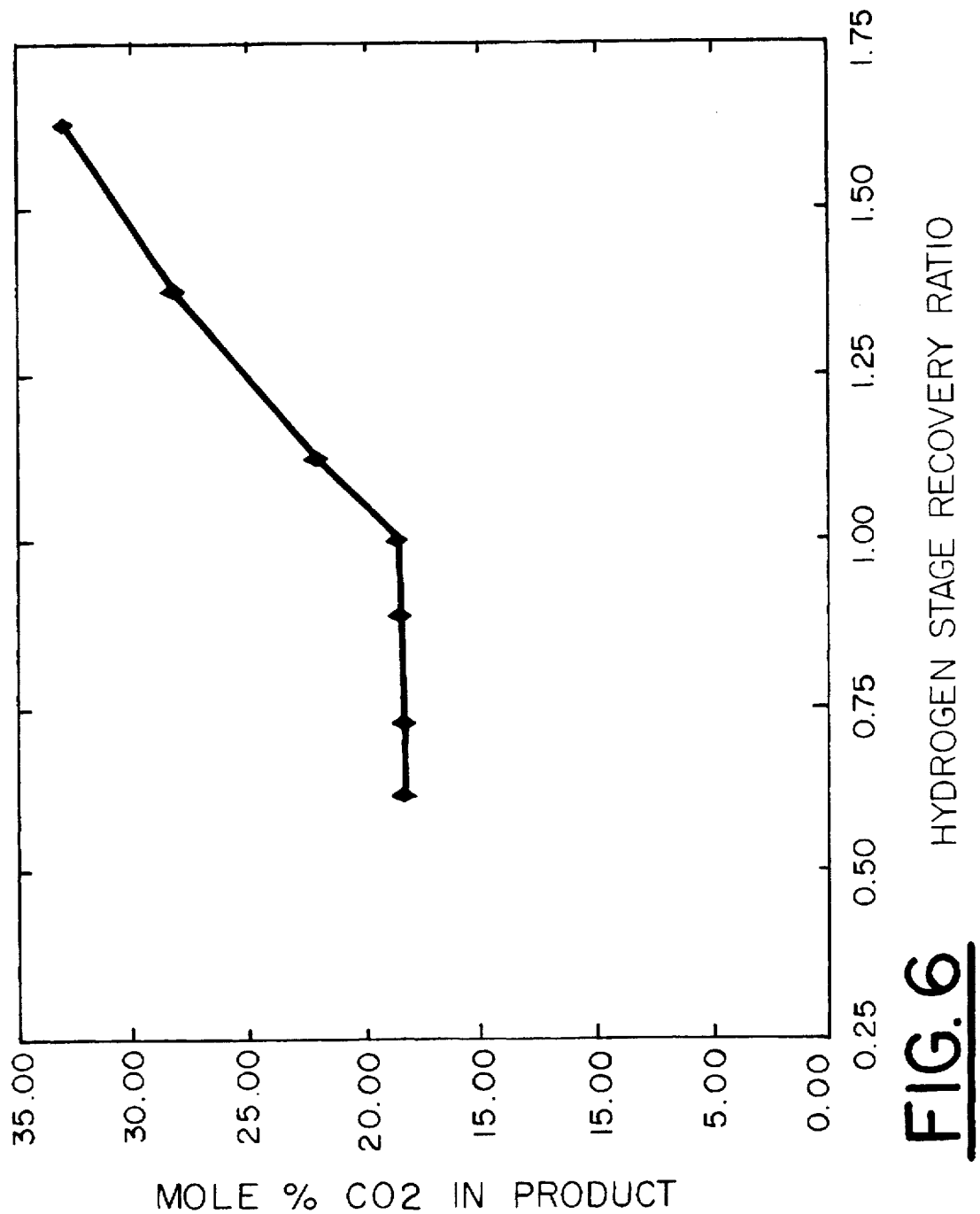
FIG. 6 is a plot of the carbon dioxide concentration in the hydrogen product vs the hydrogen stage recovery ratio for the separation of a hydrogen-carbon dioxide-methane mixture using a two-stage tubular adsorbent membrane of the present invention.
Figure 8:
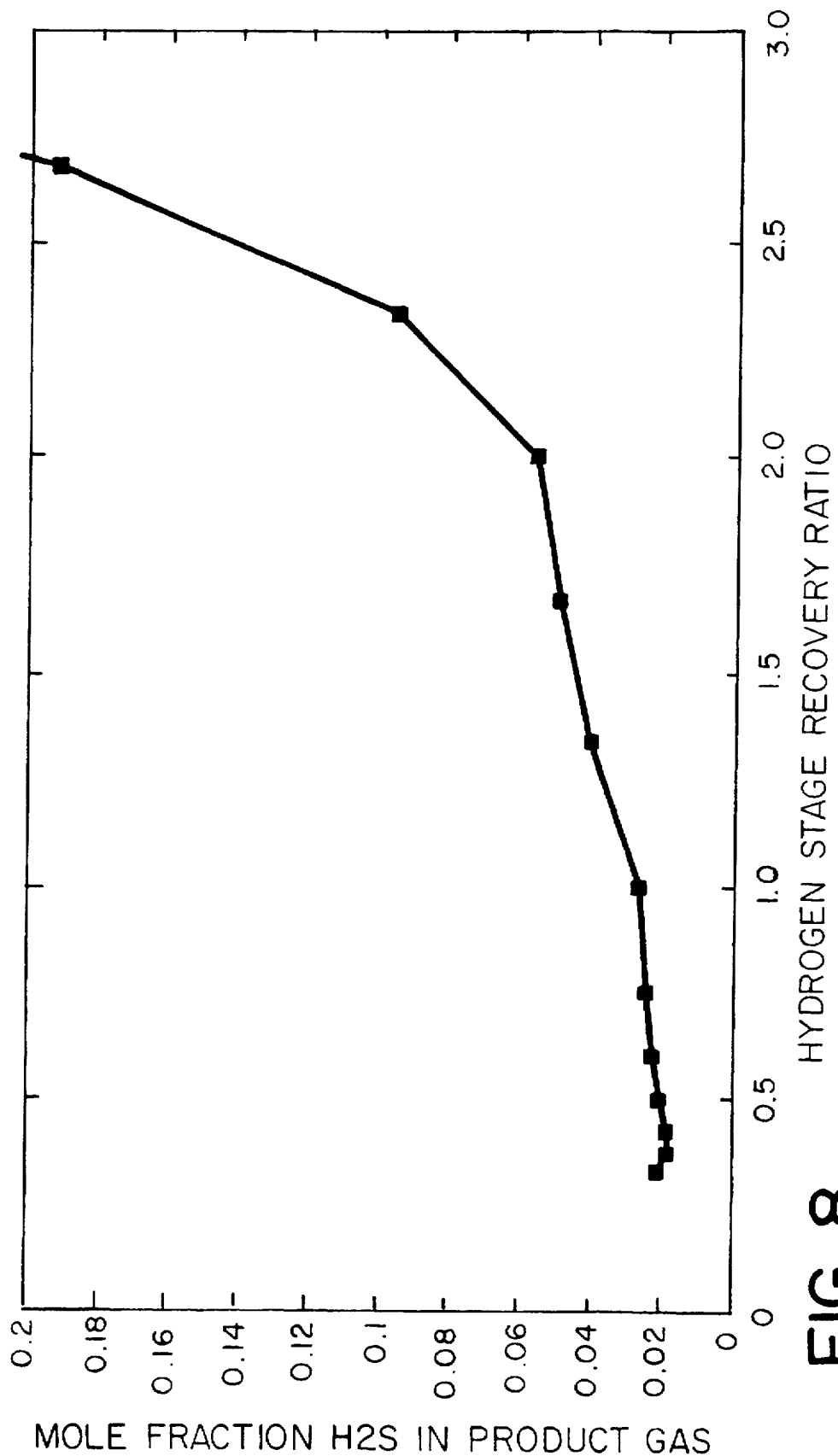
FIG. 8 is a plot of the hydrogen sulfide concentration in the hydrogen product vs the hydrogen stage recovery ratio for the separation of a hydrogen-hydrogen sulfide mixture using a two-stage tubular adsorbent membrane system of the present invention.

The performance data of FIG. 6 were used to determine the hydrogen product purity at each of the calculated values of the hydrogen stage recovery ratio above, and the results are plotted in FIG. 8. Hydrogen product purity is defined by the residual concentration of hydrogen sulfide in the product gas.

Figure 7:
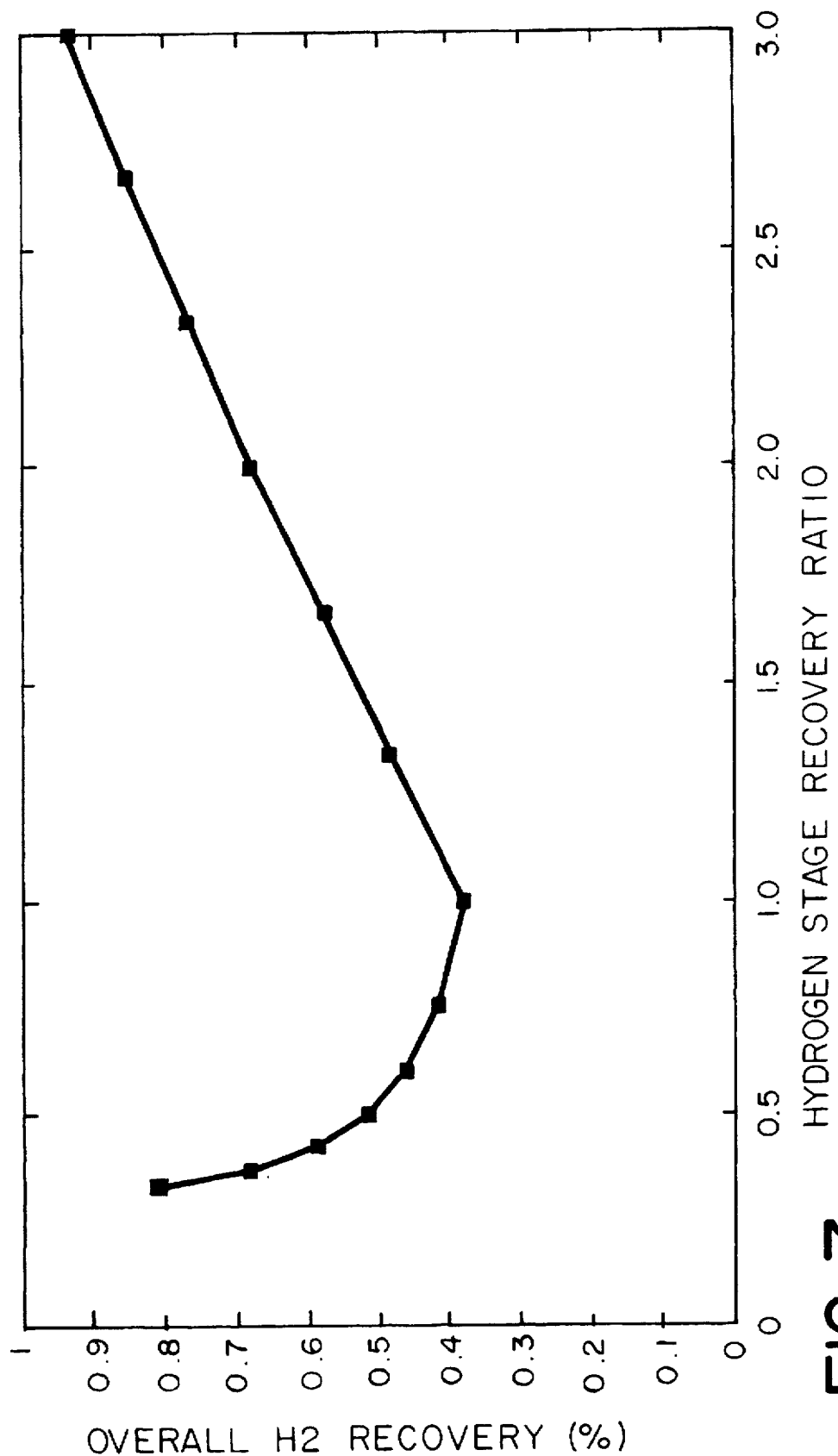
FIG. 7 is a plot of the overall hydrogen recovery vs the hydrogen stage recovery ratio for the separation of a hydrogen-hydrogen sulfide mixture using a two-stage tubular adsorbent membrane of the present invention.

FIGS. 7 and 8 in combination illustrate an important feature of the invention, as described in general terms earlier in this specification, in which a preferred operating mode exists for each stage which results in the most favorable tradeoff between overall hydrogen product recovery and overall hydrogen product purity for the two-stage system. In the preferred operating mode, the first and second membrane stages are operated such that the hydrogen stage recovery ratio is less than about 1.0 and preferably less than about 0.8. It is seen from FIGS. 7 and 8 that below a hydrogen stage recovery ratio of about 1.0, increasing the overall hydrogen recovery by reducing the hydrogen stage recovery ratio results in a slight increase in hydrogen product purity. For example, if the hydrogen stage recovery ratio is reduced from about 1.0 to about 0.5, the overall hydrogen recovery increases from about 38% to about 52% (FIG. 7) while the mole fraction of hydrogen sulfide in the hydrogen product drops slightly from about 0.025 to about 0.020 (FIG. 8). In contrast, increasing the overall hydrogen recovery by increasing the hydrogen stage recovery ratio above about 1.0 results in a decrease in hydrogen product purity. For example, if the hydrogen stage recovery ratio is increased from about 1.0 to about 1.5, the overall hydrogen recovery increases from about 38% to about 54% (FIG. 7) while the mole fraction of hydrogen sulfide in the hydrogen product increases from about 0.025 to about 0.045 (FIG. 8).

Thus the most favorable operating region for the two-stage adsorbent membrane system occurs below a hydrogen stage recovery ratio of about 1.0 wherein the hydrogen recovery in the first stage is lower, and preferably significantly lower, than the hydrogen recovery in the second stage. Operating the two-stage system above a hydrogen recovery ratio of about 1.0 can yield an acceptable overall recovery of hydrogen, but with a penalty of decreased hydrogen product purity. This is illustrated by an example wherein an overall hydrogen recovery of 70% is required. From FIG. 7 it is seen that this recovery can be achieved at a hydrogen stage recovery ratio of either about 0.4 or about 2.05. From FIG. 8 it is seen that a hydrogen stage recovery ratio of about 0.4 yields a hydrogen product containing slightly less than about 0.02 mole fraction hydrogen sulfide, while a hydrogen stage recovery ratio of about 2.05 yields a hydrogen product containing about 0.06 mole fraction hydrogen sulfide.

A generic definition of the preferred operating region for the present invention is that region which exhibits a large slope in the curve of overall hydrogen recovery vs. hydrogen stage recovery ratio (i.e. FIGS. 4 and 7) and a small slope in the curve of hydrogen product impurity level vs. hydrogen stage recovery ratio (i.e. FIGS. 5 and 8).

EXAMPLE 9

The results of Examples 2, 4, and 7 were compared to illustrate the preferred operating range of the present invention. These results are summarized in Table 4.

TABLE 4

Comparison of Operating Results for Examples 2, 4, and 7

| | Feed Gas | | |
|---|---|---|---|
| Hydrogen Recovery, % | FCC Offgas | PSA Offgas | $H_2$—$H_2S$ Mix |
| Stage 1 | 55 | 40 | 30 |
| Stage 2 | 70 | 65 | 90 |
| Overall | 80 | 66 | 77 |
| Hydrogen Stage Recovery Ratio | 0.79 | 0.61 | 0.33 |
| Hydrogen Product Purity, Mole % | 51.8 | 72.2 | 98.0 |

These Examples for three different gas mixtures illustrate the preferred operating mode for separation by the two-stage adsorbent membrane system defined in FIG. 1, namely, hydrogen stage recovery ratios of less than about 1.0 and preferably less than about 0.8. Operation of the two-stage adsorbent membrane system in this preferred mode allows the overall recovery of the primary component to be increased with no penalty or a very small penalty in decreased product purity. When the two-stage adsorbent membrane system is operated at conditions outside of this preferred mode, however, increases in overall product recovery are accompanied by more significant decreases in product purity. In the preferred mode of the invention (i.e. at a stage recovery ratio of less than about 1.0), a higher product purity can be attained for a given overall product recovery than can be attained by operating outside the preferred mode (i.e. at a stage recovery ratio of greater than 1.0).

The adsorbent membrane and staging configuration of the present invention are particularly well suited for the purification and recovery of low molecular weight primary components such as hydrogen, helium, or methane from mixtures which also contain higher molecular weight secondary components such as carbon oxides, water, hydrogen sulfide, ammonia, nitrogen, and hydrocarbons. A beneficial characteristic of adsorbent membranes used in such separations is that the heavier contaminant components selectively permeate through the membrane and the lighter primary component is recovered as a nonpermeate at near feed pressure. Recovery of the primary component at relatively high purity, at acceptable recovery, and at high pressure is particularly advantageous when final purification of the primary component by pressure or thermal swing adsorption is required.

The essential characteristics of the present invention are described completely in the foregoing disclosure. One skilled in the art can understand the invention and make various modifications without departing from the basic spirit of the invention, and without deviating from the scope and equivalents of the claims which follow.

We claim:

1. A method for separating a multicomponent gas mixture comprising at least one primary component and at least one secondary component into a product stream enriched in the primary component and one or more additional product streams enriched in the secondary component, wherein the method comprises:

(a) introducing a feed gas mixture comprising the primary and secondary components into a first membrane separation zone having a permeable adsorbent membrane comprising adsorbent material which divides the zone into a feed side and a permeate side, wherein the gas passes through the feed side of the membrane separation zone and a portion of the secondary component is selectively adsorbed by the adsorbent material and permeates through the membrane to the permeate side;

(b) withdrawing from the feed side of the first membrane separation zone a first nonpermeate stream as the product stream enriched in the primary component;

(c) withdrawing from the permeate side of the first membrane separation zone a permeate stream which is enriched in the secondary component;

(d) introducing at least a portion of the permeate stream as a feed gas into a second membrane separation zone having a permeable adsorbent membrane comprising adsorbent material which divides the zone into a feed side and a permeate side, wherein the feed gas passes through the feed side of the membrane separation zone and a portion of the secondary component is selectively adsorbed by the adsorbent material and permeates through the membrane to the permeate side, and withdrawing therefrom an additional product stream enriched in the secondary component;

(e) withdrawing from the feed side of the second membrane separation zone a second nonpermeate stream which is further enriched in the primary component, and combining at least a portion of the second nonpermeate stream with the multicomponent gas mixture to provide the feed gas to the first membrane separation zone; and (f) operating the first and second membrane separation zones such that the ratio of the recovery of the primary component in the first membrane separation zone to the recovery of the primary component in the second membrane separation zone is less than about 1.0, wherein the recovery of the primary component in any membrane separation zone is defined as the molar flow rate of the primary component in the nonpermeate stream withdrawn from the zone divided by the molar flow rate of the primary component in the feed gas introduced into the zone.

2. The method of claim 1 wherein the ratio of the recovery of the primary component in the first membrane separation zone to the recovery of the primary component in the second membrane separation zone is less than about 0.8.

3. The method of claim 1 wherein the recovery of the primary component in the first membrane separation zone is less than about 75%.

4. The method of claim 1 wherein the pressure of the feed gas mixture to the first membrane separation zone is equal to or greater than the pressure of the feed gas to the second membrane separation zone.

5. The method of claim 4 wherein the pressure of the feed gas mixture to the first membrane separation zone is at least 30 psia.

6. The method of claim 1 which further comprises compressing the feed gas prior to the second membrane separation zone.

7. The method of claim 1 which further comprises compressing at least a portion of the second nonpermeate stream prior to combining with the multicomponent gas mixture to provide the feed gas to the first membrane separation zone.

8. The method of claim 1 wherein hydrogen is the primary component and a hydrocarbon having from one to five carbon atoms is the secondary component.

9. The method of claim 1 wherein hydrogen is the primary component and a component selected from the group consisting of carbon oxides and methane is the secondary component.

10. The method of claim 1 wherein hydrogen is the primary component and a component selected from the group consisting of ammonia, nitrogen, and hydrogen sulfide is the secondary component.

11. The method of claim 1 wherein the adsorbent material used in the first membrane separation zone is selected from the group consisting of activated carbon, zeolite, activated alumina, silica, and combinations thereof.

12. The method of claim 11 wherein the adsorbent material used in the second membrane separation zone is selected from the group consisting of activated carbon, zeolite, activated alumina, silica, and combinations thereof.

13. The method of claim 1 which further comprises introducing the product stream enriched in the primary component into a pressure swing adsorption system and withdrawing therefrom a final product stream which is further enriched in the primary component.

14. The method of claim 1 which further comprises introducing the product stream enriched in the primary component into a thermal swing adsorption system and withdrawing therefrom a stream which is further enriched in the primary component.

15. The method of claim 14 which further comprises introducing the stream which is further enriched in the primary component into a pressure swing adsorption system and withdrawing therefrom a final product stream which is still further enriched in the primary component.

16. In a method for separating a multicomponent gas mixture comprising at least one primary component and at least one secondary component into a product stream enriched in the primary component and one or more additional product streams enriched in the secondary component, wherein the method includes:

(a) introducing a feed gas mixture comprising the primary and secondary components into a first membrane separation zone having a gas permeable membrane which divides the zone into a feed side and a permeate side, wherein the gas passes through the feed side of the membrane separation zone and a portion of the secondary component selectively permeates through the membrane to the permeate side;

(b) withdrawing from the feed side of the first membrane separation zone a first nonpermeate stream as the product stream enriched in the primary component;

(c) withdrawing from the permeate side of the first membrane separation zone a permeate stream which is enriched in the secondary component;

(d) introducing at least a portion of the permeate stream as a feed gas into a second membrane separation zone having a gas permeable membrane which divides the zone into a feed side and a permeate side, wherein the feed gas passes through the feed side of the membrane separation zone and a portion of the secondary component selectively permeates through the membrane to the permeate side, and withdrawing therefrom an additional product stream enriched in the secondary component; and (e) withdrawing from the feed side of the second membrane separation zone a second nonpermeate stream which is further enriched in the primary component, and combining at least a portion of the second nonpermeate stream with the multicomponent gas mixture to provide the feed gas to the first membrane separation zone;

the improvement which comprises utilizing an adsorbent membrane comprising adsorbent material as the gas permeable membrane in each of the first and second membrane separation zones in which a portion of the secondary component is selectively adsorbed from the feed gas to each zone by the adsorbent material and permeates through the adsorbent membrane to the permeate side of each zone, and operating the first and second membrane separation zones such that the ratio of the recovery of the primary component in the first membrane separation zone to the recovery of the primary component in the second membrane separation zone is less than about 1.0, wherein the recovery of the primary component in any membrane separation zone is defined as the molar flow rate of the primary component in the nonpermeate stream withdrawn from the zone divided by the molar flow rate of the primary component in the feed gas introduced into the zone.

17. The method of claim 16 wherein the ratio of the recovery of the primary component in the first membrane separation zone to the recovery of the primary component in the second membrane separation zone is less than about 0.8.

18. The method of claim 16 wherein the recovery of the primary component in the first membrane separation zone is less than about 75%.

* * * * *